US007059966B2

(12) United States Patent
Luciano, Jr. et al.

(10) Patent No.: US 7,059,966 B2
(45) Date of Patent: Jun. 13, 2006

(54) NETWORKED MULTIPLE BINGO GAME SYSTEM

(75) Inventors: Robert Anthony Luciano, Jr., Reno, NV (US); Warren Rapelye White, Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 0 days.

(21) Appl. No.: 10/891,312

(22) Filed: Jul. 13, 2004

(65) Prior Publication Data

US 2005/0208991 A1 Sep. 22, 2005

Related U.S. Application Data

(62) Division of application No. 10/142,138, filed on May 8, 2002, now Pat. No. 6,780,108.

(60) Provisional application No. 60/289,845, filed on May 8, 2001.

(51) Int. Cl.
*A63F 13/00* (2006.01)

(52) U.S. Cl. .......................... 463/19

(58) Field of Classification Search ............ 463/17–19, 463/42

See application file for complete search history.

(56) References Cited

U.S. PATENT DOCUMENTS

| | | | | |
|---|---|---|---|---|
| 6,203,427 | B1 * | 3/2001 | Walker et al. | 463/16 |
| 6,257,980 | B1 * | 7/2001 | Santini, Jr. | 463/19 |
| 6,581,935 | B1 * | 6/2003 | Odom | 273/269 |
| 6,585,590 | B1 * | 7/2003 | Malone | 463/19 |

* cited by examiner

*Primary Examiner*—Kim Nguyen
(74) *Attorney, Agent, or Firm*—Brown Raysman Millstein Felder & Steiner LLP

(57) ABSTRACT

A system and method for providing more than one simultaneous and different bingo game, using single bingo ball draws from a central location. The present invention further provides for players to be highly distributed, for example throughout the US, while still using the single centralized ball draw and still supporting different bingo games in parallel.

2 Claims, 3 Drawing Sheets

Multiple Bingo Game System
Playable Over Multiple
Physical Sites

Multiple Bingo Games Using A Single Ball Draw

Method For Distributed Bingo Play From A Centralized Ball Draw System

NETWORKED MULTIPLE BINGO GAME SYSTEM

RELATED APPLICATIONS

This application is a divisional application of application Ser. No. 10/142,138 filed on 8 May 2002 now abandoned U.S. Pat. No. 6,780,108, now U.S. Pat. No. 7,780,108 which claims the benefit of provisional application No. 60/289,845, filed on 8 May 2001.

BACKGROUND OF THE INVENTION

1. Field of the Invention

This invention pertains generally to gaming systems. More particularly, the present invention relates to a method and apparatus for playing multiple, different parallel bingo games over a very broad physical area using single centralized draws.

2. The Prior Art

Classical prior art bingo games are completely manual, encompassing physical balls in a cage with a mechanical selection means or a "blower" type selection means. After rotating a cage containing the balls, or blowing the balls in an enclosure, a ball is blown into a separate holding area or mechanically rolled into a separate holding area; that ball is then picked up and read ("called") by a ball caller. Each ball in the cage or enclosure is marked with a letter and number (i.e., "N 42"), where the letters are one of B, I, N, G, O, and the numbers are between 1 and 75.

Each player plays one or more BINGO cards. Each BINGO card has 5 rows and 5 columns. The columns are labeled from left to right with the letters "B", "I", "N", "G", "O" across the top of the card. With the exception of the center space which is considered a free space, the spaces in the card are printed with numerical values as follows: each space in the "B" column contains a non-duplicative number from 1–15; each space in the "I" column contains a non-duplicative number from 16–30; each space in the "N" column contains a non-duplicative number from 31–45; each space in the "G" column contains a non-duplicative number from 46–60; and, each space in the "O" column contains a non-duplicative number from 61–75. The balls discussed above are numbered in the same fashion (i.e., "N" balls are numbered from consecutively from N-31 to N-45).

Players, sitting in front of the ball caller, mark a square on their bingo cards in accordance with the called balls typically using a dauber (a larger colored ink marker), thus the action of a player marking their cards is called daubing. Players a responsible for recognizing when they have won one of several pre-designated winning patterns. One of those patterns will be called the winning pattern or BINGO pattern. The first player to get the overall winning pattern on one of their cards is the winner of that game, and the game ends. An example winning pattern might be 5 adjacent squares in a row or column. After the pattern is reached, any prizes or awards are given out (including those awarded or won by people who made other patterns that did not end the game, such as "four corners"). Player purchase new cards and a new game begins.

Bingo games have been automated in several ways over the years. One automation technique is to automate the ball draw and ball "call" (the ball caller is replaced by a large screen showing the balls as they are electronically drawn), while the cards and daubing remaining manual. Another is the use of a handheld device which enable players to buy bingo cards, have them be displayed on a screen, and electronically daub the squares corresponding to drawn balls. Finally, there are bingo game that are run entirely electronically, with a bank of machines in a casino or bingo hall connected to a common Floor Game Controller or Remote Game Controller. Players indicate which game they want to play (choices are typically made based on the amount bet), and when there are enough players the game begins. The balls are drawn electronically, and the drawn balls shown on each player's machine. The player typically pushes a button to electronically daub their cards as balls are drawn. The first player to daub (manually or automatically) the game-ending pattern wins, and a next game is ready to play.

The problem with existing bingo games, including manual, semi-manual, and existing electronic implementations, is that they do not enable bingo game to be played across wide physical areas. This limits the number of players playing any one game and consequently the prize amounts. In addition, there is a limitation of playing a single bingo game from each set of drawn balls. There is a need to provide a significantly larger coverage for individual bingo games, enabling more players to participate and larger prize amounts to be awarded.

BRIEF DESCRIPTION OF THE INVENTION

The present invention provides a method and apparatus enabling a single centralized system to play multiple simultaneous different bingo games using a single ball draw over an extraordinarily large area (i.e., the continental US), thus enabling large numbers of player of a large area to play the same games, further enabling significantly larger prizes to be available than previously possible.

A preferred embodiment will have be one central bingo system, a plurality of central bingo game controllers (CBGCs) where each CBGC controls at least one bingo game controller (BGC) and its particular bingo variants. The central bingo system distributes master ball draws to the CBGCs, and allocates electronic bingo card ranges to CBGCs from a superset of non-repeating cards. The CBGCs will typically be reasonably close to the central bingo system connected by a LAN, and will use the first n balls of the master draw as required by the game they master, will distribute the n balls to each BGC (which will typically be a significant physical distance from the CBGC to which it is operably networked, perhaps 1000's of miles), and will allocate electronic bingo card ranges to BGCs from it's set of non-repeating cards. The BGCs will distribute n balls to each player terminal or bingo electronic aid attached to it, will distribute groups of cards to bingo electronic aids, will activates cards for play as players elect to play, will play cards to detect possible bingo winning events comprised of predetermined patterns on bingo cards, will have the capability of alerting its CBGC of a potential bingo (winning event), and will receive from a player the player's signal or indicia that the player has recognized the winning event and has caused the machine to recognize it, and in such cases where that is required (i.e., in cases where winning bingo events are presented to a player in alternate visual forms, such as simulating a horse race or simulating a reel slot game), the BGS, electronic bingo aid, or CBGC will generate the alternate visual form corresponding to that winning bingo event.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
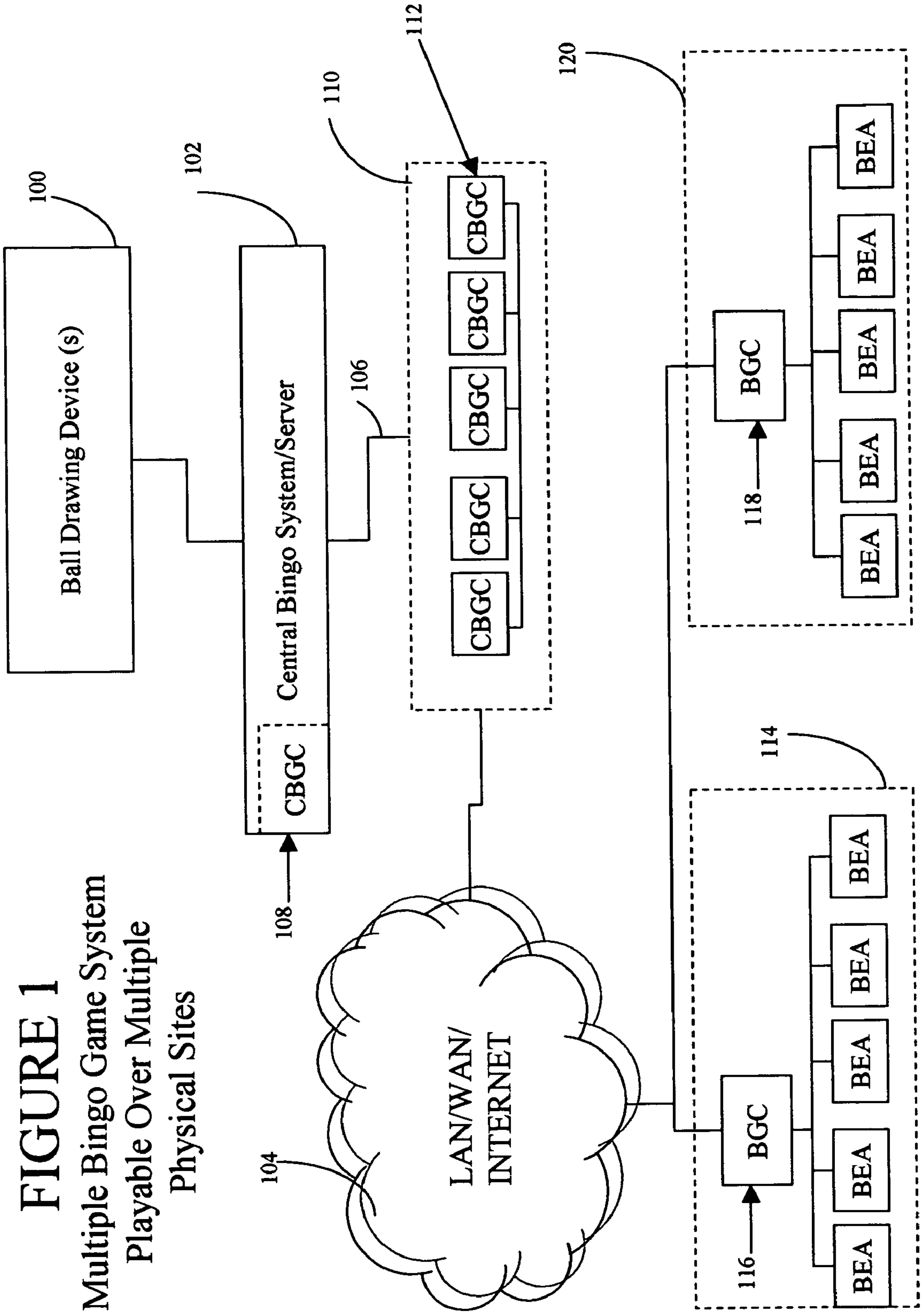
FIG. 1 is a functional block diagram of a bingo gaming system according to the present invention.
Figure 2:
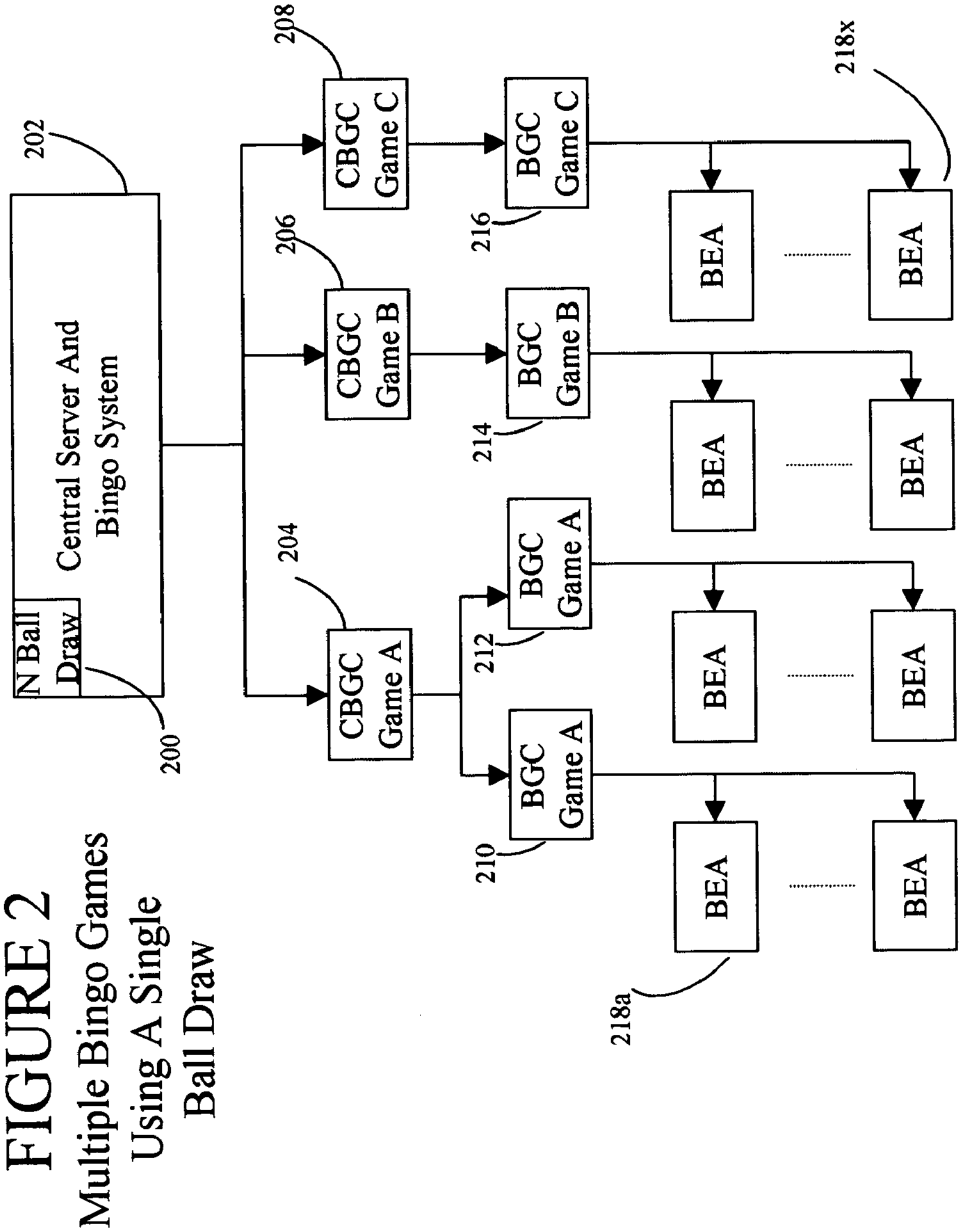
FIG. 2 is a block diagram of multiple bingo games playable from a single ball draw according to the present invention.
Figure 3:
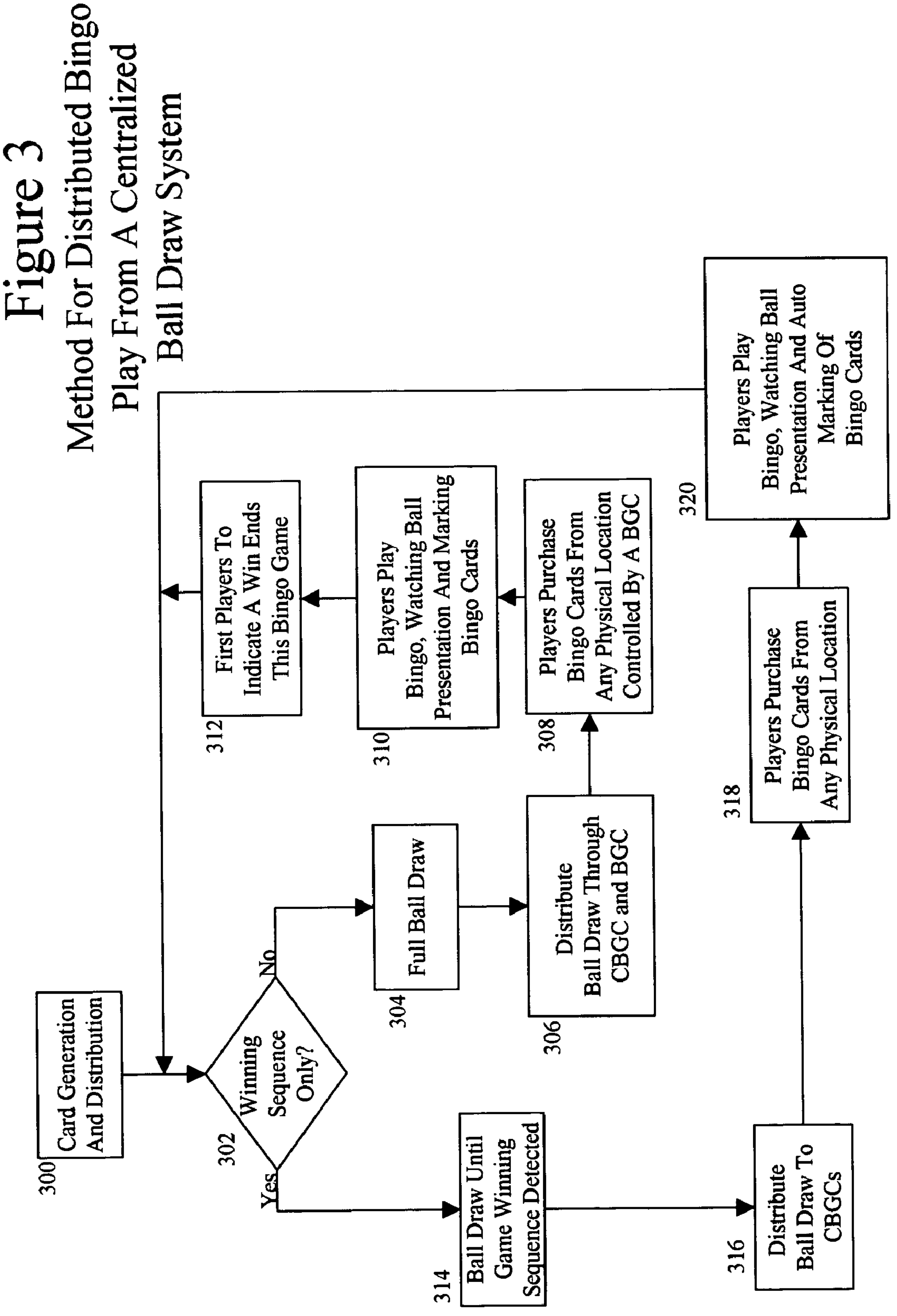
FIG. 3 is a flow diagram of an example bingo system according to the present invention.

Referring to the drawings, for illustrative purposes the present invention is shown embodied in FIGS. 1 through 3. It will be appreciated that the apparatus may vary as to configuration and as to details of the parts, and that the method may vary as to details and the order of the acts, without departing from the inventive concepts disclosed herein.

The current invention comprises a networked bingo gaming infrastructure that enables a single central bingo gaming machine or machines to run a plurality of bingo games and a plurality of physically disparate sites, using one or more ball draws for all games, specified subsets of games, or for each game. The present invention also enables the creation of alternative displays of a winning bingo event, where the results of a bingo win or other bingo game state are shown in a manner that has the visual appearance of a sports event, a gaming machine, or other interesting representation.

An infrastructure in accordance with the present invention is shown in FIG. 1. There is a ball drawing device 100, which may be a mechanical device operated be a person who has input means into the Central Bingo System 102 (such as a PC with a network card and a keyboard where the person types in the drawn ball numbers), an automated ball draw device having the needed electronic support to be in operable communication with Central Bingo System (CBS) 102, or a fully automated system which generates ball drawings electronically with no actual physical balls present and is in operable electronic communication to CBS 102.

CBS 102 is typically a data processing device or computer operably configured to support the compute requirements of a centralized bingo device, and having the well-known-in-the-art hardware components including a CPU, memory for the CPU, and I/O interfaces including but not limited to keyboard, disks, and operating system such as Microsoft's® NT® or Linux, and at least one network interface in operable communication with network 106. Network 104 is shown as a cloud to represent any combination of LAN, WAN, or perhaps Internet connections needed to transport data to from CBS and Central Bingo Game Controllers (CBGCs) to the Bingo Game Controllers (BGC) at local sites. It may be the case that network 104 and network 106 may be the same network, depending on the installation. CBS also has the software needed to run bingo games as described herein, the software being operably disposed within CBS 102.

Also shown are several CBGCs, indicated generally as CBGC 112 representing standalone systems and connected via network 106 to CBS 102. Another embodiment would have CBGC 108 implemented as a software component inside of CBS 102. In a preferred embodiment, each CBGC will be a standalone system, and will control the bingo games (types of bingo games) allocated to it. The CBGCs will typically be in close physical proximity to CBS 102, at a central location, indicated by dotted line box 110.

Each CBGC is assigned one or more Bingo Gaming Controllers (BGCs), where the assigned BGC is only controlled by that CBGC and no other. The BGCs are located at remote sites from its assigned CBGC, covering any physical distance and in operable communications over network 104. As mentioned above, network 104 may be any type of operable network connection, including any combination of LANs and/or WANs, including making use of the internet, with the present invention fully contemplating that BGCs may de distributed throughout the United States.

Each BGC is operably connected to local bingo electronic aids (BEAs). BEAs are typically connect to a BGC via a serial connection. The present invention fully contemplates the ability to use any networked connection, with another preferred embodiment being an ethernet-based LAN.

There is at least one ball draw to play one or more bingo games, which may be carried out in ball drawing device 100 or internally to CBS 102. At least one set of bingo cards is also created (in this case, electronic representations of bingo cards), where each card set is further divided into decks, with decks being kept (stored electronically) and distributed by CBS 102. IT may also be the case that the software used to generate the bingo card sets, and then divide them into decks, also runs on CBS 102. In one preferred embodiment, one deck at a time will be electronically sent (they may be simply assigned and then drawn from, but this would only be an embodiment for less physically disparate installations) to a designated CBGC. The decks are selected by either a random method, a predetermined method, or by the type of bingo games that are being played by the individual bingo game machines controlled by each CBGC. After the card decks are distributed and available to the CBGCs, the CBGCs further distribute cards to the individual BGCs under their control. BGCs enable individual cards to be played by individual bingo electronic aids (BEAs), where there may be more than one card allocated at a time to an individual machine to be played by a player, depending on the bingo game being played and the amount the player has purchased.

Reference has been made to different bingo games. Although the "traditional" bingo card is a 5×5 matrix, any size card may be used coupled with any set of pre-designated winning patterns, in addition to having different bingo games having different sets of pre-designated winning patterns. For example, it would be entirely possible to have bingo games played on 2×2 cards, although it would not be very interesting to most players.

In any case, different games may require a different number of balls to be drawn. Note that the ball draws may be handled differently to conform to jurisdictional requirements. For example, if it is decided that the bingo games must be played in real time, without any electronic device (including the central server) determining ahead of time if there is a winning bingo card and who has it, the ball draw may be made by electronically drawing a complete set (all 75 balls), and that draw sequences then being sent to each CBGC. If that is not a requirement, then a ball draw could be created where the cards in play are compared to the ball draw, and the ball draw sequence stopped when it is known there is a winning card. Which is chosen will also be determined by how the player bingo terminals (Bingo Electronic Aids, or BEAs), run by the BGCs, are implemented. If the daubing is not automated, then there is a possibility a player will be a "sleeper", that is, someone whose card is a winner but missed marking a ball or two, thereby enabling another player to win bingo first by being the first to declare a win. In that case, since the mere existence of a winning card is not enough to determine a winner, the entire ball sequence will be generated. If the BEAs are auto-daubing (daub the squares on a card corresponding to drawn balls without player intervention), then the ball draw sequence can stop as soon as it is determined there is a winning card. All such variations are fully contemplated by the present invention.

After the start of a game, it is possible using the present invention to have a single ball draw run multiple games. This is shown in FIG. 2. After a ball sequence of n balls is generated by mechanical or electronic means as shown in box device 200, the sequence is either transmitted and/or stored and used by CBS 202. CBS 202 then distributes the ball sequence, or a subset thereof, to each CBGC. FIG. 2 shows three CBGCs: 204; 206; and 208, where each is playing a different bingo game. CBS 202 will distribute the appropriate ball sequence length to each CBGC (the original sequence length "n" was drawn to include the longest sequence needed by any operable or in-play CBGC, thereby including any shorter sequence needed by other CBGCs). FIG. 2 shows the local bingo game controllers (BGCs) receiving the needed ball sequence for the type of bingo game being played by the individual bingo electronic aids (BEAs) under the BGCs control. BGC 210 and BGC 212 are controlling the same type of bingo games, and are therefore using the same ball sequences, so receive the same sequence from the same CGBC 204. BGC 214 receives its ball sequence from CBGC 206, and BGC 216 receives its ball sequence from CBGC 208. In all cases the card decks have been previously generated and distributed by CBS 202 to each CBGC, and each CBGC has passed decks or portions thereof to BGCs, which present them to players for play and on which the current ball sequence being sent to each BGC will be used.

Individual bingo player or playing stations are shown and indicated as BEA 218*a* through BEA 218*x*. Any number may be present. A typical player terminal will have high-resolution video monitors and I/O devices, including but not limited to touch screens, buttons, keyboards, ticket printers, network interfaces, and electro-luminescent attract panels, and are not limited to one form factor. These components are operably interconnected to perform the functions needed of a BEA.

A unique aspect of the current invention is the ability, using the displays of the BEA, to generate alternative displays of any and all bingo results. This would be particularly useful or enticing when presenting the results of a game such as "bonanza bingo", where the ball sequence is typically presented at a single time (the entire draw sequence at one time) and mapped immediately to a card. Alternatively, a linear mapping of each ball (letter-number) in a sequence may be mapped as they are made available onto a card purchased by a player. The card may or may not be displayed on the screen as the balls are mapped to the individual squares of the bingo card—this display or non-display of the card as it is being filled in or marked off electronically may be up to the player. Once the results of the game being played are known, the player may choose, or the system may choose, to represent the outcome in a form other than the traditional bingo card, called entertainment images (EIs).

EIs are generated such that they match the value of the bingo game just played, but are symbolically represented in a form the player chooses. One such EI would be a slot machine, where the EI shows a typical slot machine that has stopped (or is stopping and then stops) such that the payline(s) on the reels have a value equal to that of the bingo game just finished. Another could be a poker hand or a sequence of hands, again resulting in the same value as the bingo game just completed. Another would be a sports event, where the results of the winning bingo game are appropriately mapped into a winning sports event and graphically displayed. Numerous similar EIs will readily come to the mind of a person of ordinary skill in the art and with the benefit of the present disclosure.

Thus, the present invention allows for multiple bingo games to be played simultaneously using the same ball draw in a manner that will be entertaining while retaining the essential characteristics of bingo games, and further permitting the player a choice of output forms.

FIG. 3 shows a method enabling a centralized ball draw with multiple remote bingo game playing capability. Box 300 corresponds to the actions of creating a bingo card set electronically for each type of bingo game needed (there may be a plurality of sets created), dividing each set into decks, then distributing the decks to the needed level of game controller, enabling each player terminal (or BEA) to send a signal to the controller for individual bingo cards as needed. 300 is not shown as re-entered, but it is to be understood that the BGCs will generate requests for decks as the decks are used up; when the CBGCs have distributed their last deck, they will generate a request for more decks to the central server for the overall centralized bingo game system. This system will then generate a new set of cards for the bingo games needed, divide it into decks, and then electronically store and send the decks as needed by the CBGCs. This will be happening during the entire time the system is up and serving bingo games.

Entering decision point 302, the central system (alternatively, the system designated to create the ball sequences in communication with the central server) determines if a full or partial ball draw is to be made. This determination can be made on numerous criteria, including if the player terminal connected to the BGCs use automated daubing. If they do, the ball draw can be tailored to the exact number needed for the winner to be declared, by comparing the results of the randomized ball draw with the cards that have been bought by players. There are other cases where it may be decided to use full draws, even if the BEAs use automated daubing. Another case would be where there is enough of a delay in network 104 of FIG. 1 to create frustration on the players part. Yet another is if the requirement is based on local laws of a jurisdiction where players are located. The specific ball draw type used will be determined for each installation.

Whatever criteria are used (performance, jurisdictional requirements, etc.), the full criteria set being represented by decision point 302, a decision is made if a full or partial ball draw is made for the bingo game play. If a full ball draw is to made, the "No" exit is taken to box 304. The actions corresponding to 304 are that an entire ball sequence is created, long enough to cover all outstanding games (games in play). Box 304 is left and box 306 is entered. The ball draw is sent to the CBGCs to the BGCs. Box 306 is left and box 308 entered.

The action corresponding to box 308 are the player purchasing one or more bingo cards at the player terminal (BEA), thus enrolling the player in the current bingo game. NOTE! Although shown as occurring after the ball draw, in many systems these activities happen either in parallel, or the players enroll by buying bingo cards after which a ball sequence is (or may be) generated. All such variations in sequences of events are fully contemplated herein, and all are supported by the disclosed bingo infrastructure.

After enrolling, box 308 is left and box 310 is entered. The actions corresponding to box 310 are those associated with a player playing a bingo game, watching the ball sequence appear before them on their BEA, or an a display screen visible to the players at a particular site. The player indicates to the BEA or player terminal when the balls are to be daubed. Play continues until a player declares themselves to be a winner, where box 310 is left and box 312 entered.

312 corresponds to the actions of having a player indicate to the BEA or player terminal that they have a winning bingo card, or, if a winning bingo ball is daubed, the BEA indicated to the BGC that the player has a winning card. The BGC checks to see if this is correct (i.e., do the balls called or sent correspond to a winning bingo card currently being played by the player), and if so, halts the game. Awards are made, and box 312 is left for box 302, beginning the play sequence again.

If, at decision point 302, the ball draw sequence will be only carried out until it is determined that a winning sequence has been generated, the "Yes" exit is taken to box 314. The actions taken in 314 correspond to those needed to generate a ball draw sequence that results in a winning pattern on each of the games being played, using the cards bought or to be bought. Box 314 is left and box 316 entered. The actions corresponding to 316 include distributed the short ball sequence to the CGBCs, and then to the BGCs. Box 316 is left and box 318 entered. The actions corresponding to box 318 are those of a player purchasing bingo cards, and the BGC providing them to the BEA. As discussed above, this action may have occurred much earlier than shown in the illustration. Continuing on with 320, once players have enrolled in the current bingo game by buying bingo cards, the balls are illustrated in some manner on the BEA, with any winning patterns being shown on the bingo card or alternative display.

In overview, one preferred embodiment will be one CBS, a plurality of CBGCs, where each CBGC controls at least one BGC and its sub-game. The CBS distributes master ball draws to the CBGCs, and allocates electronic bingo card ranges to CBGCs from a superset of non-repeating cards. The CBGCs will use first n balls of the master draw as required by the game they master, will distribute the n balls to each Bingo Game Controller, and will allocates electronic bingo card ranges to BGCs from it's set of non-repeating cards. The BGCs will distribute n balls to each BEA attached to it, will distribute groups of cards to BEAs, will activates cards for play as players elect to play, will play cards to detect possible bingo (winning events), will have the capability of alerting its CBGC of a potential bingo (winning event), and will receive from a player the player's signal or indicia that the player has recognized the winning event and has caused the machine to recognize it, in such cases where that is required (i.e., in EI situations there may be some bingo play where the player does not need to explicitly or manually indicate a winning event, rather, the BGS or CBGC does it and then generates the EI corresponding to that winning event or bongo event).

In another preferred embodiment, bingo games can be played with paper or with a BEA, either simultaneously using the same draws or separately using independent draws.

In another preferred embodiment, bingo play, such as Bonanza, wherein cards and draws are predetermined prior to sales and distribution, simultaneous manual and BEA play could operate. In a real time draw/display simultaneous play could also operate and/ or the BEA could also operate a faster draw game.

As introduced earlier, once a game outcome is determined in terms of the amount won, a display outcome can be reverse mapped into a display image that correlates with an award paytable (such as Double Diamond) to provide enhanced player entertainment. By initiating the animated display sequence (such as an animated reel spin). When the draw request occurs, enables the entertainment of display to proceed while the draw process and communications are completed, mapping the final display symbols into the ending display sequence. (Additionally, portions of the outcome can be allocated for secondary award or bonus display sequences.)

The results of the draw(s) can be simultaneously displayed on the same display device or can be displayed on a separate display device on the BEA.

In some variations, game can be played with paper or with BEA, either simultaneously using the same draws or separately using independent draws.

In a bingo play, such as Bonanza, wherein cards and draws are predetermined prior to sales and distribution, simultaneous manual and BEA play could operate in a real time draw/display simultaneous. Play could also operate and/or the BEA could also operate a faster draw game.

Once a game outcome is determined in terms or the amount won, a display outcome can be reverse-mapped into a display image that correlates with an award paytable (such as Double Diamonds) to provide enhanced player entertainment. By initiating the animated display sequence (such as an animated reel spin) When the draw request occurs, enables the entertainment of display to proceed. While the draw process and communications are completing, mapping the final game display of cards and draws can occur at general levels of network hierarchy, such as a remote site, local central computer or at game cluster levels. Card selection could occur at the BEA level (from a predetermined set).

Since the probability for some defined sequences, such as the first five draws resulting in an ordered bingo is extremely low (about 1 in 2 billion plays) this can provide for a lot of game draws against pre-selected card sets before a game is computed. This can provide for very high jackpots such as $10 million for 25¢ per card with a 2% progressive fund contribution.

Also, additional game variety can be provided by offering several game types from the same draw, each having variations of lower pay award sequences (such as a "b" or an "o" in a corner).

Further enhancement to game variety occurs with games that use a pre-determined number of balls per draw, such as 5, repeated until the game is complete. This provides a large variety of combinations and is very fast. It is possible to have multiple games operating off the same draw cycle each using different sub-sets of the draws (such as the first five, the first ten, the first twenty and so on) to operate a larger variety of game pay award combinations.

Although the description above contains exemplar specificity, the description should not be construed as limiting the scope of the invention but as providing an illustration of the presently preferred embodiment of the invention. The scope of this invention should be determined by the appended claims and their legal equivalents.

The invention claimed is:

1. A method of providing a plurality of simultaneous bingo games for players to play, the method comprising:

having a central bingo server;

selecting a bingo game available on a first player terminal;

selecting a bingo game available on a second player terminal, where said first player terminal is operably connected to a first bingo game controller over a first private network and said second player terminal is operably connected to a second bingo game controller over a second private network, and where said first and second bingo game controllers are in operable communication with said central bingo server through at least one central bingo game controller using a third network;

drawing a set of bingo balls where said set of bingo balls is a sequence long enough to encompass bingo games selected on said first player terminal and said second player terminal;

distributing said set of bingo balls from said central bingo server to said at least one central bingo game controller;

identifying which balls from said set of drawn balls are needed for said bingo game selected at said first player terminal and said game selected at said second player terminal by said at least one central bingo game controller;

sending said identified balls from said at least one central bingo game controller to bingo game controllers operably connected to it; and, allowing players to play bingo games using said identified balls.

2. The method of claim 1 where said central bingo game server and at least one of said central bingo game controllers are implemented in the same physical device.

* * * * *

UNITED STATES PATENT AND TRADEMARK OFFICE

CERTIFICATE OF CORRECTION

PATENT NO. : 7,059,966 B2
APPLICATION NO. : 10/891312
DATED : June 13, 2006
INVENTOR(S) : Robert A. Luciano, Jr. and Warren R. White It is certified that error appears in the above-identified patent and that said Letters Patent is hereby corrected as shown below:

Column 1
In line 7, delete “now abandoned”
In line 8, delete “now U.S. Pat. No. 7,780,108”
In line 26, replace “i.e.” with --e.g.--
In line 45, delete the first occurrence of “from”
In line 50, replace “a” with --are--
In line 59, replace “Player” with --Players--
In line 67, delete “be”

Column 2
In line 9, after “balls” insert --are--
In line 12, replace “a” with --the--
In line 30, replace “player” with --players--
In line 46, replace “it’s” with --its--
In line 60, replace “BGS” with --BGC--

Column 3
In line 15, after “purposes” insert --,--
In line 34, replace “be” with --by--
In line 48, replace “Microsoft’s” with --Microsoft--

Column 5
In line 26, after “so” insert --they--
In line 66, replace “payline” with --payline(s)--
In line 67, delete “(s)”

Column 6
In line 53, delete the first occurrence of “to”
In line 59, replace “are” with --is--

UNITED STATES PATENT AND TRADEMARK OFFICE

CERTIFICATE OF CORRECTION

PATENT NO. : 7,059,966 B2
APPLICATION NO. : 10/891312
DATED : June 13, 2006
INVENTOR(S) : Robert A. Luciano, Jr. and Warren R. White It is certified that error appears in the above-identified patent and that said Letters Patent is hereby corrected as shown below:

Column 7
In line 25, replace “distributed the” with --distributing--
In line 27, after “318” insert --is--
In line 43, replace “allocates” with --allocate--
In line 44, replace “it’s” with --its--
In line 46, replace “activates” with --activate--
In line 53, replace “i.e.” with --e.g.--
In line 57, replace “bongo” with --bingo--

Column 8
In line 28, replace “ment. By” with --ment by--
In line 29, after “spin)” insert --.--
In line 30, before “enables” insert --it--

Signed and Sealed this

Twenty-eighth Day of November, 2006

JON W. DUDAS
*Director of the United States Patent and Trademark Office*